United States Patent
Bergamini

(10) Patent No.: US 6,539,812 B1
(45) Date of Patent: Apr. 1, 2003

(54) SYSTEM FOR MEASURING THE FLOW-RATE OF A GAS BY MEANS OF ULTRASOUND

(76) Inventor: Giorgio Bergamini, Via C. Rosalba, 46/f sc.d, 70124 Bari (IT)

( * ) Notice: Subject to any disclaimer, the term of this patent is extended or adjusted under 35 U.S.C. 154(b) by 0 days.

(21) Appl. No.: 09/913,900

(22) PCT Filed: Feb. 22, 2000

(86) PCT No.: PCT/IT00/00056
§ 371 (c)(1),
(2), (4) Date: Aug. 20, 2001

(87) PCT Pub. No.: WO00/50852
PCT Pub. Date: Aug. 31, 2000

(30) Foreign Application Priority Data

Feb. 24, 1999 (IT) ........................ BA99A0008

(51) Int. Cl.[7] .................................. G01F 1/66
(52) U.S. Cl. ................................... 73/861.29
(58) Field of Search ................... 73/861.25, 861.27, 73/861.28, 861.29

(56) References Cited

U.S. PATENT DOCUMENTS

| | | | | |
|---|---|---|---|---|
| 4,633,714 A | * | 1/1987 | Mazumder et al. ......... | 356/336 |
| 4,852,575 A | * | 8/1989 | Nikoonahad ............. | 73/861.27 |
| 5,383,369 A | | 1/1995 | Khuri-Yakub et al. ... | 73/861.29 |
| 5,426,501 A | * | 6/1995 | Hokanson et al. ....... | 250/222.2 |
| 5,650,572 A | | 7/1997 | Vontz ..................... | 73/861.28 |
| 5,652,396 A | | 7/1997 | Gill ........................ | 73/861.27 |

FOREIGN PATENT DOCUMENTS

| | | |
|---|---|---|
| DE | 197 27 960 | 2/1999 |
| EP | 0 650 034 | 4/1995 |
| JP | 60-61621 | 4/1985 |

* cited by examiner

Primary Examiner—Harshad Patel
(74) Attorney, Agent, or Firm—Flynn, Thiel, Boutell & Tanis, P.C.

(57) ABSTRACT

An improved system for measuring the flow-rate of a gas by means of ultrasound, including a tubular element in which a plurality of openings are formed to allow one or more gas-flows to flow into the tubular element, and two or more devices for transmitting/receiving ultrasound beams. The system further includes two or more devices for focusing ultrasound beams. The transmitting/receiving devices transmit and receive, respectively, the ultrasound beams which pass through the focusing devices and the one or more gas-flows inside the tubular element and thus measure the flow-rate thereof.

13 Claims, 2 Drawing Sheets

SYSTEM FOR MEASURING THE FLOW-RATE OF A GAS BY MEANS OF ULTRASOUND

FIELD OF THE INVENTION

Figure 1:
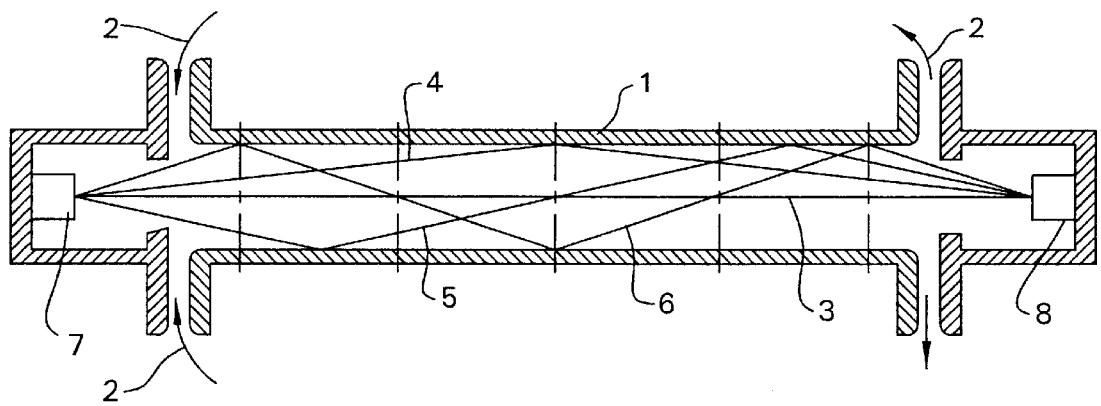

The present invention relates to an improved device for achieving an excellent measurement of the flow-rate of a gas in a tube, without the need for any correction algorithm, by evaluation of the transit time of an ultrasound system by virtue, for example, of the use of reflectors with parabolic structure and of arrangements which eliminate all of the disturbances and errors which render measurements problematical in known apparatus.

BACKGROUND OF THE INVENTION

Three basic types of disturbance in the achievement of a correct signal during the measurement of the flow-rate of a gas are known:

a) the distribution of the velocity of the gas in the measurement cross-section, which may be laminar with a profile varying from elliptical to flat according to the distance from the inlet and the Reynolds number, or turbulent with a greater or lesser degree of disturbance due also to asymmetry; a system of ultrasound beams passing through portions of gas having different velocities in fact reaches the receiver with delays in time, normally measured in terms of phase, which are varied and erratic to the extent of not only causing measurement errors but even of cancelling out the signal when the various contributions arrive with mean values in phase opposition;

b) diverging and not flat propagation of the ultrasound emission which causes reflections on the walls of the measurement tube with the result of obtaining various sound paths between the shortest, which corresponds to the axial direction of the tube to be measured, and the longest which involve one or more reflections on the walls; in this case also the errors and interference may cancel out the measurement signal;

c) non-uniform distribution of the energy within a diverging or parallel ultrasound beam; this leads to an error in the integration of the signal received in relation to the measurement of the transit time when portions of the ultrasound beam having unequal energy levels pass through the gas flow which has regions characterized by different velocities; the integration of the signals thus produces a weighted mean velocity in which the regions through which ultrasound beams with greater energy levels pass have greater weight.

Clearly, the three types of disturbance in combination make the problem of achieving accurate measurements very difficult, particularly when there are large variations in the flow-rate and also when the speed of the sound is subject to variations connected with the type and temperature of the gas being measured.

In order to reduce the effects of the first two types of disturbance, the practical solutions available in the prior art generally adopt geometry of the gas-flow tube based on the flat or annular slit principle, in which the spacing of the walls is such as to reduce the angles of reflection to an extent such as to render the paths of the reflected sound little different from the direct paths without any reflection, as well as achieving a reduction in the Reynolds number by virtue of the slot so as always to have a laminar condition, in order to limit problems connected with the distribution of the velocities in the measurement tube.

Many of these solutions involve surfaces having indentations provided for absorbing the reflected ultrasound beams which may interfere with the correctness of the measurement and with the signal/noise ratio which, however, from the energy point of view, becomes gradually worse as some of the sound energy is absorbed by the surfaces.

In order to reduce the angle of spread of the ultrasound beam transmitted and thus to reduce the energy which is lost and also harmful in terms of interference, in the known solutions, the transmitters/receivers generally used are characterized by diameters several times larger than the wavelength of the sound in the gas, and thus have quite high natural frequencies, for example, as an order of magnitude, of about 200 kHz.

As a consequence of the less than optimal solution of the problems relating both to the unevenness of the velocity distribution and to the fact that the propagation of the sound emission is not flat with parallel paths, as well as to the non-uniform distribution of the energy within the ultrasound beam performing the measurement, the known apparatus generally has measurement errors, as the flow-rate varies, which necessitate experimentally-based correction calculations, whilst the unfavourable signal-noise ratio leads to power consumption which is not optimized.

In French patent application FR A-2683046, the reflections are arranged so as to prevent the second type of disturbance mentioned above with the use of a geometry based on an ellipsoid of rotation in which the paths with a single reflection between the two focus points of the ellipse are uniform.

However, although on the one hand, this solution solves the problems connected with the second type of disturbance, on the other hand, it does not solve the problems connected with the first and third types of disturbance mentioned above which are more than sufficient to render the measurements uncertain. Moreover, in order to eliminate direct transmission without reflections, the device of the French document FR A-2683046 involves the insertion of a central solid which is also necessary in order to achieve a uniform gas-flow cross-section in which the measurements take place, and this gives rise to a considerable loss of energy in addition to the spurious reflections which nevertheless arise and interfere with the measurement.

The main object of the present invention is to overcome the disadvantages of the known devices described above, achieving a high degree of intrinsic accuracy without the need for software corrections, combined with a high signal/noise ratio, such that it is possible to reduce power consumption and the size of the batteries required for the necessary autonomy.

Another object of the present invention is to overcome the problems of the known solutions connected with the elimination of variable and irregular profile distribution by propagating the ultrasound beam not only parallel to the generatrix of the measurement tube and with a flat front, but also with a uniform energy distribution throughout the cross-section, so as to achieve a perfect integration of all of the components of the movement of the gas, in the axial direction alone. Only in these conditions does the measurement in fact become independent of the conditions of movement of the gas and also insensitive to any asymmetry of the flow created by ducting upstream of the inlet.

A further object of the present invention is to provide a gas-flow measuring device which can be produced easily and quickly, and which comprises a limited number of elements so as to reduce its cost at the manufacturing stage.

In order to achieve the objects indicated above, the subject of the present invention is an improved system for measuring the flow-rate of a gas by means of ultrasound, comprising a tubular element in which a plurality of openings are formed to allow one or more gas-flows to pass inside the tubular element, and two or more means for transmitting/receiving an ultrasound beam, characterized in that it further comprises two or more means for focusing ultrasound beams, the transmitting/receiving means transmitting and receiving, respectively, the ultrasound beams which pass through or are reflected by the focusing means and pass through the one or more gas-flows, inside the tubular element.

One embodiment of the present invention comprises the sound equivalent of two optical lenses, of which the first transmission lens transforms a diverging beam originating from a first transmitting/receiving means into a parallel beam which passes through the entire gas-flow measurement tube, whilst another downstream lens with a symmetrical arrangement focuses the beam at a point where a second transmitting/receiving means is located. With these characteristics, it is possible to achieve the maximum ratio between signal and noise.

One of the main advantages of the present invention consists of the production of an ultrasound beam with an energy distribution which, by virtue of the focusing means, is very uniform throughout the cross-section, in contrast with the arrangements of the prior art which mostly provide for transmission with a beam which diverges as little as possible. This advantage can be achieved, for example, with the use of transmitting/receiving means characterized by a spherical, non-focused emission, substantially by virtue of a diameter to wavelength ratio, for example, of less than about 1 and of relatively low resonance frequencies, typically, but not exclusively of about 40 kHz.

In a further embodiment of the present invention, the means for focusing the sound-wave beam comprise, for example, instead of materials with different acoustic refraction indices which are difficult to produce, two portions of parabolic mirrors, with two reflections which give rise to an intermediate ultrasound beam with parallel generatrices. It is thus possible to achieve a functionality in the acoustic field which is completely identical to the optical functionality with the advantage, in addition to simplicity, of permitting acoustic alignment by optical means. Naturally, focusing means with shapes other than those indicated above may also be used, as long as the objects of the present invention can be achieved.

A further advantage of the present invention consists of the use of an optical check for verifying the existence, in the measurement tube, of a system of optical rays parallel to the axis of the tube, which thus confirms that the propagation of the ultrasound beam is actually flat and thus suitable for correctly integrating all of the axial contributions to the velocity of the fluid along the measurement tube. The uniformity of the energy throughout the measurement cross-section can also be checked easily, for example, but in a non-limiting manner, by optical means.

Another advantage of the present invention consists of the use of two reflections on the above-mentioned parabolic surfaces which permit identical paths for the entire beam transmitted, which is better than in the arrangement which provides for the use of the lenses and is free of the problems of a continuously variable cross-section in arrangements based on ellipsoidal geometry with a single reflection.

Figure 2:
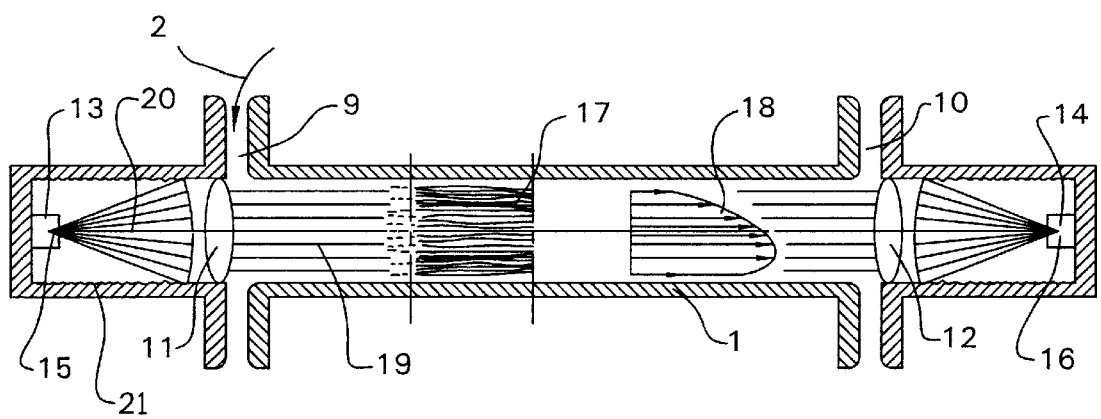
Figure 3:
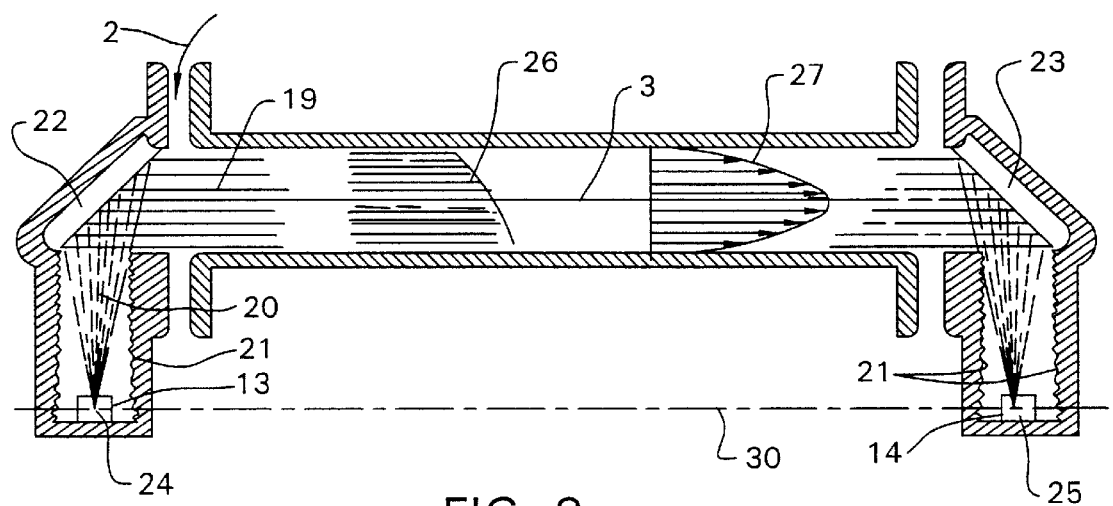
Figure 4:
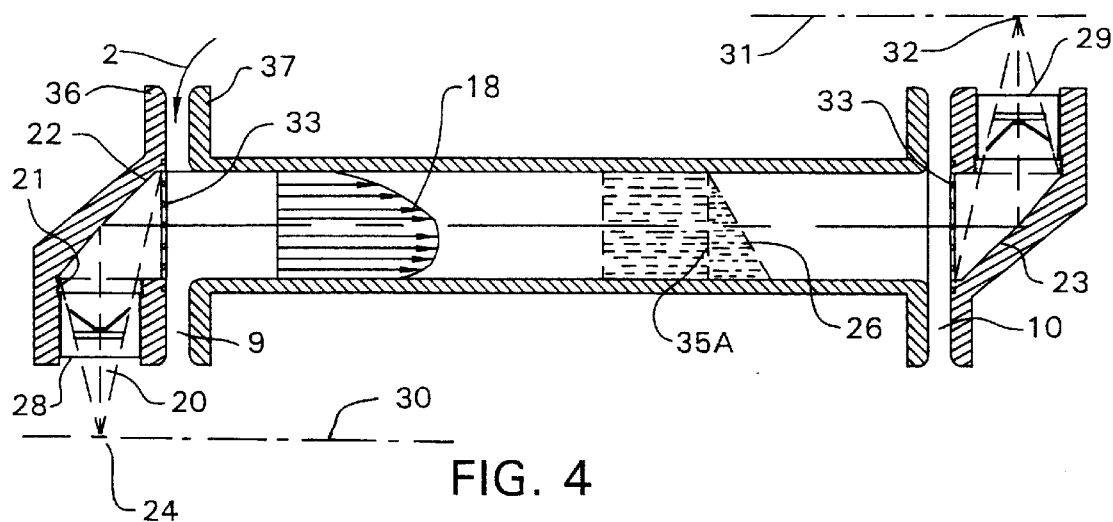
Figure 5:
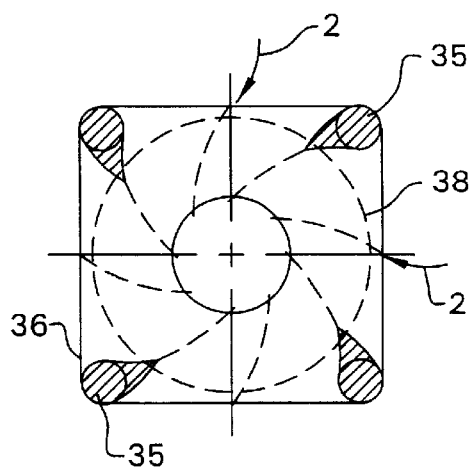
Figure 6:
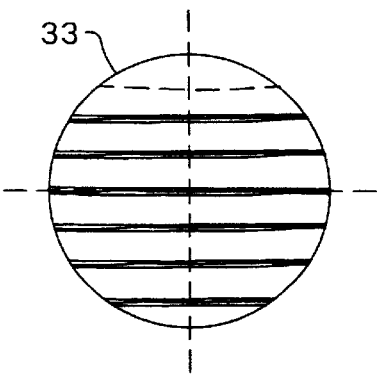
Figure 7:
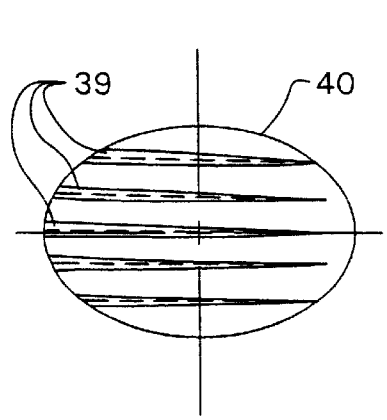
Figure 8:
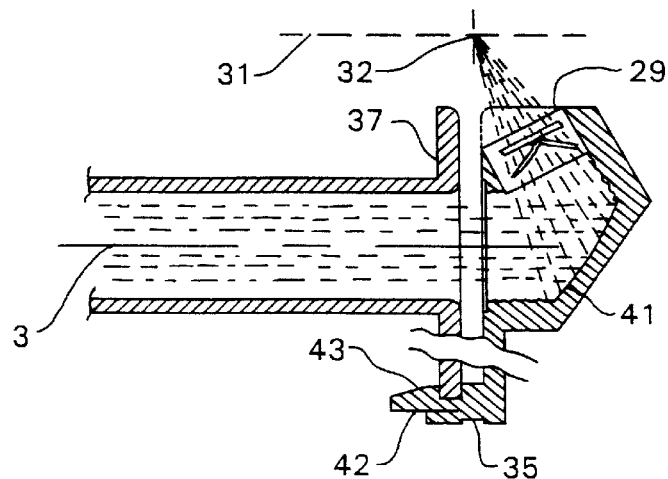

Further characteristics and advantages will become clear from the following description of a preferred embodiment, given with reference to the appended drawings provided purely as a non-limiting example, in which:

FIG. 1 is a side view showing, in section, a device of known type for measuring the flow-rate of a gas, comprising an ultrasound flow diagram with several reflections, FIG. 2 is a side view showing, in section, an embodiment of the present invention comprising two sets of ultrasound lenses, FIG. 3 is a side view showing, in section, a further embodiment of the present invention comprising two parabolic mirrors and two point transmitters, FIG. 4 is a side view showing, in section, another embodiment of the present invention comprising two opposed parabolic mirrors and two infinitesimal transmitters, FIG. 5 is a plan view of a square flange comprising profile elements for the rotational orientation of the flow, FIG. 6 is a front view of a partition which is semitransparent to ultrasound, FIG. 7 is a front view of a parabolic mirror comprising incisions of suitable area, and FIG. 8 is a side view showing, in section, a detail of the inclined mounting of the transmitter and of the quick-fitting device of an embodiment of the present invention.

DETAILED DESCRIPTION

With reference now to the drawings, FIG. 1 illustrates a known device in which a flow diagram of an ultrasound beam is indicated, showing the problems resulting from the diverging propagation of the ultrasound emission in air. In fact, this diagram shows by way of example, in a measurement tube 1 through which a gas is flowing, four flow paths 3 to 6 representing surfaces with rotational symmetry about the axis of the measurement tube 1 and characterized by the presence of respective reflections in the tube 1.

Each path has a different length, from a minimum for the straight path 3 to a maximum for the path 6 with three reflections, so that the same signal transmitted by the transmitter 7 and received by the receiver 8 has different transit times, to the extent of compromising the measurements, particularly when the transit time is evaluated in terms of the phase of a sinusoidal signal and when the path differences are not infinitesimal in comparison with the wavelength of the ultrasound propagation.

To continue now with the description of the present invention, FIG. 2 shows a substantially ideal device for measuring the flow-rate of a gas-flow, characterized by a measurement tube 1 which is generally empty without any elements disposed inside it, is typically but not necessarily cylindrical since it could also have a square or other shaped cross-section, and comprises two slots 9, 10, for example annular slots extending radially, for the inlet and for the outlet of a gas-flow 2 the flow-rate of which is to be measured.

Focusing means, for example, two sets of ultrasound lenses 11, 12, housed at the two ends of the measurement tube 1, render parallel an ultrasound beam 19 which is transmitted and received by two ultrasound transducers 13, 14 having very small dimensions and positioned at the respective foci 15, 16 of the two sets of lenses 11, 12.

If, by virtue of the dimensions of the transmitter 13, 14, the energy flow transmitted is uniform angularly and the lenses 11, 12 are free of aberrations, the ultrasound flow 19 in the measurement tube 1 is characterized not only by a flat front but also by an energy distribution 17 which is uniform in all of the gas-flow cross-sections, with the result that it is possible to perform a perfect integration of any distribution of the motion in the gas, such as the deformed-paraboloid 18 distribution shown by way of example in FIG. 2.

The system is perfectly aligned when the entire ultrasound beam 19 passes through the measurement tube 1 without any reflection.

For this purpose, only a cone of direct emission 20 from the transmitter 13 reaches the lens 11 and is focused whilst the energy outside this cone is absorbed by walls 21 which, for example, are scored or comprise means which prevent energy transmission.

FIG. 3 shows an alternative embodiment of the present invention which is based on the same principle of operation and in which the lenses 11, 12 of FIG. 2, which are very complex to produce in the acoustic field, have been replaced by other focusing means, for example but in a non-limiting manner, by portions of paraboloids of rotation 22, 23. These portions of paraboloids 22, 23 achieve the same result of producing an ultrasound beam 19 aligned with the measurement tube 1, without reflections in the tube 1, from two transmitters/receivers 13, 14 arranged perpendicular to the axis of the tube 1 at the foci 24, 25 of the paraboloids 22, 23.

In the case of the paraboloids 22, 23 also, in order to focus only the central cone 20 of the energy emitted, the tube 1 comprises, for example, but in non-limiting manner, absorbent surfaces 21 which eliminate all of the reflections unsuitable for forming the parallel measurement beam 19 which passes along the measurement tube 1.

However, although the parabola portion 22, 23 greatly simplifies the problem of converging the emission cone 20 into a parallel beam, with the advantage over the system based on lenses 11, 12 of always having a path of equal length for every ray transmitted and received, at the same time, it has the fault of producing an emission front, shown in FIG. 3, which is indeed flat but is also characterized by an energy distribution 26 which is not uniform throughout the cross-section.

In fact, the energy reflected by a parabolic mirror generally decreases gradually in the direction away from the central reflection coinciding with the alignment 30 of the two foci of the parabolas 22, 23.

This phenomenon does not adversely affect the accuracy of the measurement when the flow is perfectly axially symmetrical, as is typically the case for a laminar flow with a flat or parabolic profile 27 since, with a subsequent convergence of the beam at a single point, an integration takes place by which the strong signals are compensated by the weak ones.

If, however, the plenum chambers at the inlet and the diaphragms characteristic of known devices for producing a regular and axially symmetrical flow in the measurement tube are not present, this non-uniform distribution may give rise to some inaccuracy.

Since the object of the invention is also to simplify the components greatly and to reduce their number so as to reduce the overall cost of the device, a series of inexpensive measures have been identified for eliminating the loss of accuracy resulting from this characteristic of the parabolic mirror without necessitating the addition of the above-mentioned known accessories.

Before continuing with the description, another energy limitation of the arrangement of FIG. 2 and FIG. 3 should be mentioned and is connected with the use of very small transmitters/receivers in order to have a spherical emission with uniform energy and also to cause the device to coincide with the centre of emission. In these conditions, apart from the useful cone 12, the emission is largely wasted.

With transmitters/receivers 28, 29 with diameters which are larger, as shown in FIG. 4, but remain within the limitation of being less than the wavelength at the frequency and with the sound speeds provided for, according to another characteristic of the present invention, the emission may be oriented so as to have a uniform, substantially spherical transmission front solely in the emission cone 20, whereas the energy reduces rapidly at the sides so as to reduce energy wastage.

It is advantageous to use sensors larger than point sensors not only for energy reasons in order to maximise the signal/noise ratio, but also for economic reasons, since it is technologically easy to construct resonant devices of 5/7 mm diameter characterized by optimal coupling with air with natural frequencies of around 40,000 Hz, such as are commonly used in motor-vehicle alarm systems.

The use of transmitters/receivers 28, 29 of this latter type, according to a further characteristic of the present invention, thus enables the devices 28, 29 to be brought closer to the two parabola portions 22, 23.

According to a preferred embodiment of the present invention, it is in fact possible to reduce the above-mentioned noise by rotating the parabola portions 22, 23 relative to one another in a manner such that the axis 30 of the first paraboloid on which the focus 24 lies no longer also contains the focus 32 of the second paraboloid, which lies on a second axis 31 disposed on the opposite side of the measurement tube 1.

This reversed arrangement of the two parabolas 22, 23 has the object of partially compensating for the non-uniformity of the energy flow 26 transmitted by the first parabola 22 since the parabola 23 refocuses the signal received with a greater gain at the top where the signal is weaker and with a lesser gain for the lower portion, shown in FIG. 4, where the ultrasound flow has a higher energy level.

The two transmitters/receivers 28, 29 can be positioned closer to the parabolas 22, 23 because, with the larger dimensions of the receivers/transmitters 28, 29, the position of the centre of emission is not at the centres of the transmitters/receivers but adopts a virtual position substantially offset from the receivers/transmitters 28, 29 and it is this virtual point which has to coincide with the foci 24, 32 of the paraboloids 22, 23.

The positioning of the devices 28, 29 closer to the paraboloids 22, 23 thus leads to the advantage not only of reducing overall size, but also of reducing the problems of absorption of the flow transmitted outside the useful cone 20, given the drastic shortening of the portion of the wave support and guide tube 1 which is provided with reflection-absorbing means 21.

According to another characteristic of the present invention, the radial slots 9, 10 for the admission and outlet of the gas comprise shaped spacers 35 which, for example, but in non-limiting manner, are comma-shaped, as shown in FIG. 5, so as to impart to the inlet gas-flow 3 an optimized rotary component so that the motion in the measurement tube 1 adopts a helical course which can cause the gas to perform a whole number of turns before emerging, as takes place with firearm projectiles.

In fact, with one or more complete turns, and with the integration of the signal performed by the ultrasound beam 19, which is much quicker than the gas flow, it is possible to achieve not only complete elimination of the effects of any asymmetry of the input flow 18 due to the absence of calming devices in front of the inlet slots 2, but also a reduction in the effects of the non-uniformity of the energy 26 reflected by the parabolas 22, 23.

A preferred but not exclusive embodiment of the present invention comprises two gas-flow admission and outlet flanges 36, 37, shown in FIG. 5, which border the radial slots 9, 10 and are, for example, square so that the spacers 35 which serve to interconnect the flanges 36, 37 are in practice disposed outside the circular inlet shape 38 inscribed in the square, so that they do not constitute an obstacle to the flow.

According to another characteristic of the present invention, the paraboloid mirrors comprise a plurality of grooves, for example, but in a non-limiting manner, formed by deep incisions 39, as shown in FIG. 7, in which the mirror 40 of a paraboloid has, for example, an elliptical shape, so as to reduce the area of the reflecting regions which give rise to a reflection with greater energy.

A further characteristic which can limit the defects of the parabolas consists of the provision, in front of the mirrors 22, 23, of diaphragm elements 33 of material semi-transparent to the ultrasound flow, with the function of also limiting sound phenomena due to the gas flow 2.

Owing to variations in their thickness and composition, these diaphragm elements may have a variable degree of transparency from the top to the bottom as shown in FIG. 6, so as partially or fully to compensate for the energy distribution due to the reflection on the parabola 22, 23, as shown in FIG. 4 for the profile 35A.

A further characteristic which can reduce the difference in sound intensity in the straight beam reflected by the parabola is that shown in FIG. 8 in which a parabola portion is positioned as close as possible to the axis of the paraboloid 4 given that, as with lenses, the distribution becomes practically uniform on the axis itself.

For this purpose, with the physical limitation that the ultrasound transmitting/receiving device should not form a shadow on the transmitted beam which passes through the measurement tube 1, the device may be inclined in a manner such that the transmission axis is inclined at an angle smaller than about 90° to the axis of the tube 1 and to the axis 31 of the paraboloid, provided that the virtual centre of emission 32 nevertheless falls at the focus of the paraboloid 41.

In a practical embodiment, more than one of the arrangements described, with different intensities of action, may be combined to give rise to a combined effect which is optimal for the accuracy of the measurements without increasing the number of parts of which the device is composed which, in addition to the two transmitters/sensors, may thus consist substantially of only three parts: two housings for the sensors, provided with the parabolic mirror and two square flanges 36 from which four shaped, for example comma-shaped, spacers 35 project, plus the measurement tube 1 which in turn has two flanges 37, for example, square flanges which have, at their corners in the region of the spacers and fixed to the flanges, means for the anchorage of the two above-mentioned housings.

A preferred solution for the anchoring means comprises resilient elements 42 which project from the comma-shaped profiles 35 and have respective teeth 43 for selectively engaging suitable abutments formed in the opposed flange 37. This permits extremely quick snap-fitting without the use of screws or tools and without increasing the number of components, in accordance with the objectives of the present invention.

Naturally, the principle of the invention remaining the same, the forms of embodiment and details of construction may be varied widely with respect to those defined in the appended claims, without thereby departing from the scope of the present invention.

What is claimed is:

1. An improved system for measuring the flow-rate of a gas by means of ultrasound, said system comprising a tubular element which is elongate along an axis and inside of which pass one or more gas-flows, two or more transmitting/receiving devices for transmitting/receiving ultrasound beams, two or more focusing devices connected to the tubular element, the transmitting/receiving devices transmitting and receiving, respectively, the ultrasound beams, which ultrasound beams pass through or are reflected by the focusing devices and pass through the one or more gas-flows inside the tubular element and thus measure the flow-rate of the one or more gas-flows, wherein each focusing device defines a first focal point positioned a discrete distance therefrom and a second focal point positioned an infinite distance therefrom, each transmitting/receiving device being positioned between one of said focusing devices and the first focal point thereof so that ultrasound beams transmitted and received by each transmitting/receiving device coincide with ultrasound beams transmitted and received by a point dimension transmitter positioned at a first focal point of a respective focusing device, the axial direction of the ultrasound beams disposed between the two focusing devices having a uniform energy density and a uniform axial direction parallel to the axis of the tubular element.

2. A measuring system according to claim 1, wherein the focusing devices are arranged opposite one another inside the tubular element and each comprises a focusing lens, the transmitting/receiving devices being respectively positioned at the foci of the focusing lenses.

3. A measuring system according to claim 1, wherein each focusing device comprises a portion of a paraboloid of rotation having its axis of symmetry parallel to the axis of the tubular element and lying outside the tubular element.

4. A measuring system according to claim 3, wherein the transmitting/receiving devices are arranged in positions perpendicular to the axis of the tubular element and are located at the focal points of the respective paraboloid portions.

5. A measuring system according to claim 3, wherein the paraboloid portions have respective focal points and axes of symmetry parallel to the axis of the tubular element but lying on opposite sides thereof, the virtual origin points of the ultrasound beams respectively lying at the focal points of the paraboloid portions.

6. A measuring system according to claim 1, wherein the tubular element is defined by a portion of cylindrical and straight tube, free of internal obstructions, said tube comprising at its two ends in a region where a plurality of gas admission and outlet openings are defined, the focusing devices, the focusing devices producing an ultrasound beam which passes through the tube with all of its generatrices parallel to the axis of the tube and with a uniform energy density throughout the cross-section, starting from the two transmitting/receiving devices which have point dimensions and are positioned at the respective focal points of the focusing devices.

7. A measuring system according to claim 6, wherein each focusing device comprises a portion of a paraboloid of rotation, the paraboloid portions being opposed to one another and having their axes of symmetry parallel to the axis of the tube and lying in positions outside the tube, the transmitting/receiving devices being housed at the respective focal points of the two paraboloid portions so that the ultrasound beam reflected by the two paraboloid portions has, in its central portion which passes through the tube, a path which is parallel to the axis of the tube, so that all paths are also of equal length, in order to perform a correct integration of all types of axially symmetrical distribution of the gas velocity.

8. A measuring system according to claim 7, wherein the transmitting/receiving devices are not of infinitesimal dimensions but the diameter of the active portion of each of the devices is less than the wavelength of the ultrasound beam transmitted, the transmitting/receiving devices are arranged in positions in the vicinity of the two paraboloid portions at an inclination not necessarily perpendicular to the axis of the tube, whilst only the virtual point of origin of the emission of the ultrasound beam is made to coincide with the focal point of the respective paraboloid portion, the focal points in turn being disposed on opposite sides of the axis of the tube, so that the non-uniform distribution of the energy of the reflected ultrasound is re-modulated during reflection, on receipt, by an inverse law.

9. A measuring system according to claim 11, wherein the tube is assembled with two housings for the transmitting/receiving devices and the two paraboloid portions, and flexible projections disposed in the region of the spacer elements for orienting the flow and comprising teeth for permitting quick snap-engagement of the housings to the tube.

10. A measuring system according to claim 8, wherein the transmitting/receiving devices have a resonance frequency of about 40 kHz and an active diameter substantially less than the wavelength of the sound in the gas to be measured, thus achieving, in combination with the above-mentioned focusing devices, at the same time and with respective double focusing, a maximum energy output by virtue of the optimal acoustic coupling of components of this type with the gaseous fluid, and the minimum industrial cost.

11. A measuring system according to claim 7, wherein the inlet openings for admitting the gas to the tube comprise radial slots, and spacer elements with comma-shaped aerodynamic profiles are arranged in the slots and are oriented with an inclination such as to impart to the entering gas a rotary component which can cause the gas to perform a whole number of complete rotations as it passes through the tube so as to favour, by means of the integration performed by the ultrasound beam, both an axially symmetrical distribution of the velocity of the gas and a uniform distribution of the energy in the ultrasound beam passing through the tube.

12. A measuring system according to claim 7, wherein two partitions of material semitransparent to ultrasound are formed in front of the paraboloid portions and have a variable degree of transparency so as to modify the ultrasound energy distribution to the extent of rendering the distribution uniform throughout the cross-section of the tube, by absorption of energy in excess of the lowest value.

13. A measurement system according to claim 7, wherein grooves are formed in each of the two paraboloid portions, particularly for reducing the useful reflecting surface in accordance with a pattern suitable for bringing about a partial or total correction of the non-uniform distribution of the ultrasound energy in the ultrasound beam reflected in the tube.

* * * * *